United States Patent [19]

Kölzer

[11] Patent Number: 4,820,575

[45] Date of Patent: Apr. 11, 1989

[54] REINFORCING MATERIAL

[76] Inventor: Klaus K. Kölzer, Benrather Schlossufer 65b, D-4000 Düsseldorf, Fed. Rep. of Germany

[21] Appl. No.: 930,471

[22] Filed: Nov. 13, 1986

[30] Foreign Application Priority Data

Nov. 15, 1985 [DE] Fed. Rep. of Germany ....... 3540537

[51] Int. Cl.$^4$ .............................................. B32B 5/16
[52] U.S. Cl. .................................. 428/240; 428/221;
428/224; 428/253; 428/283; 428/294; 428/295;
428/327; 428/402; 428/408; 428/902
[58] Field of Search ............... 428/283, 240, 323, 327,
428/402, 407, 253, 221, 224, 294, 408, 902, 295

[56] References Cited

U.S. PATENT DOCUMENTS 4,460,642 7/1984 Frredi et al. ................... 428/283

Primary Examiner—James J. Bell
Attorney, Agent, or Firm—Sprung, Horn, Kramer & Woods

[57] ABSTRACT

Figure 1:
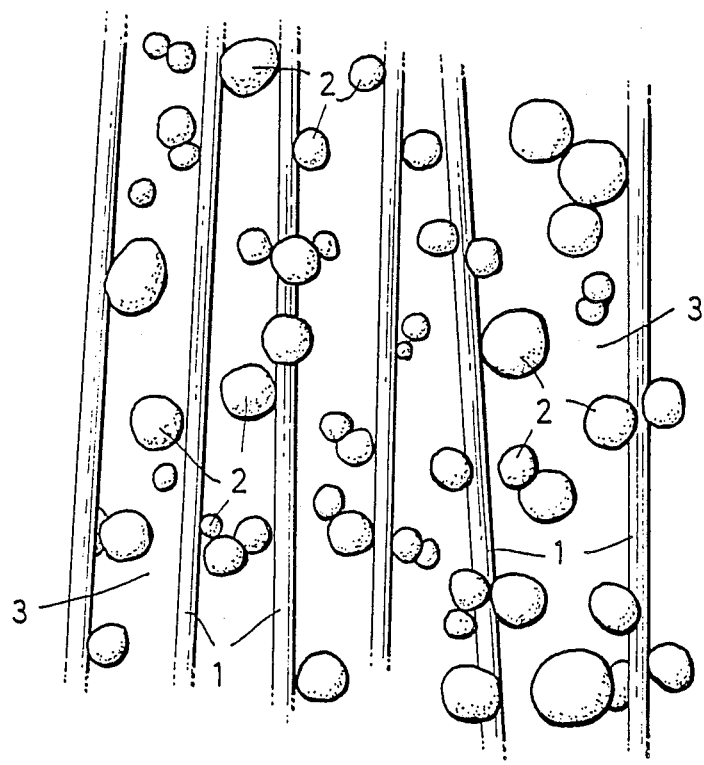

The invention relates to a reinforcing material for duroplastics and a process of preparing the same by embedding hollow body fillers (microspheres) in the interspaces of the fibers of a web, knitted fabric or stitch bonded products of fibers having a high modulus of elasticity. By virtue of the incorporation of the hollow body fillers, the particle diameter of which amounts to between 20 and 300 $\mu$m, the absorbing capacity for liquid curable resins can be adjusted to the desired value. The process of the subject invention teaches to incorporate the unexpanded preform of a hollow body filler into the interspaces of the fibers and to subject the so-obtained material for a sufficient period of time to the temperature necessary for the blowing process of the preform. The reinforcing material can be used for preparing light laminates of duroplastic materials (FIG. 1).

10 Claims, 1 Drawing Sheet

REINFORCING MATERIAL

The invention relates to a reinforcing material for duroplastics as well as to a process for preparing the same.

In the manufacture of plastic moldings, one is increasingly endeavoring, for reasons of design and economy, to reduce the weight without impairing the mechanical strength.

By reinforcing plastics with fibers one obtains so-called fiber composites which compared to the non-reinforced plastics, are characterized by a substantially higher modulus of elasticity, i.e. a higher stiffness and, therefore, have a higher stability under load. In particular fiber composites made of duroplastics, such as the classical amino- and phenoplastic resins, epoxide resins (EP resins), polyester- (UP resins) and other reaction resins, are widely used in many fields and for many purposes, inter alia as curable molding materials, molded laminated materials, casting resins or for surface protection.

Glass fiber reinforced epoxide or polyester resins are among the most commonly used fiber composites. Moldings made of this material are prepared by wetting the glass fibers with the liquid duroplastic resins and placing the same into a mold. The curing is brought about by a catalyst added to the liquid synthetic resin. Glass fiber reinforced plastics are molded unpressurized or according to various low-pressure methods and processed to form preferably large moldings, such as boat hulls, vehicle parts, storage containers, ductings etc, which are characterized by an unusually high service life and low weight. The use and strength characteristics of materials of the kind depend, on the one hand, on the quality of the reinforcing fiber and the used resins and, on the other hand, on the weight ratio of the reinforcing fibers to the resin matrix. The strength data are the better, the higher the weight ratio of the reinforcing fibers.

In the manufacture of large volume moldings and series of smaller moldings necessitating expensive molding apparatuses for their manufacture which are untenable from the point of view of costs, the no-pressure method is applied. One no-pressure method is, for example, the hand lamination, which consists of building up the molding in layers of flat-shaped articles, such as mats, webs, non-woven fabrics or the like, which are wetted with liquid resin, until the desired material thickness is obtained.

The winding technique is also a no-pressure method comprising winding up the resin-wetted reinforcing webs or fiber strands on a mandrel or cylindrical member and curing the same. In the drawing process, reinforcing webs or fiber strands are likewise wetted with resin and are thereafter drawn through molding dies. The portion of reinforcing fibers in the overall weight of a fiber composite, which is decisive for the strength characteristics, can be influenced only within limits in the no-pressure method. When the reinforcing fibers are soaked with liquid resins, the cavities present between the elementary filaments are filled with resin, depending on the absorptive capacity of the fibers.

Thus, the portion of the reinforcing fibers in the overall weight is the smaller the larger the absorptive capacity of the reinforcing fibers, based on the volume. The glass fibers available on the market as reinforcements for fiber composites have conventional standard qualities with defined resin absorptive capacity allowing the constructor to calculate the specific weight and the overall weight of a molding. For instance, glass fiber mats consisting of chopped or continuous filaments have a resin pick-up of about 70 to 75% by weight, while the absorptive capacity of glass fiber webs comprising yarns, double yarns and rovings attains about 65 to 70%. In stitch bonded products in which the yarns, double yarns or rovings are not interwoven, but are connected to each other by stitches at the crossing points, the resin pick-up is still about 60 to 65%. Accordingly, a specific weight of from about 1.5 to 1.7 is attained in laminates prepared from glass fiber mats, while the specific weight of webs and stitch bonded products is from about 1.7 to 1.9.

In order to reduce the weight of plastic moldings without loss of mechanical strength, the resin may be partially replaced by fillers having a smaller specific weight than the soaking resin, while keeping the proportion of reinforcing fibers constant. Accordingly, light fillers, so-called hollow body fillers, also called "microspheres", are suitable, which may be both of inorganic as well as of organic nature. Hollow microglass spheres are a light filler exhibiting the small specific weight necessary for reducing the density. Hollow microspheres of the kind may also consist of a polymeric organic material and are, for example, available under the trade name Expancel ® with a thermoplastic shell comprising a vinylidene chloride-acrylonitrile-copolymer. The grain size is in the range of between 50 and 300 μm and the density amounts to from about 20 to 40 kg/m$^3$.

Standard on the market is also the unexpanded preform of this hollow body filler, e.g. copolymers based on polyvinyl chloride or vinylidene acrylonitrile with an expansion agent, like e.g. isobutane. The unexpanded particles (e.g. "unexpanded" Expancel) have a particle size of 5 to 10 μm. In order to expand them they are subjected to temperatures of around 80° to 150° C., which correspond to the softening point of the material of the microspheres. As soon as the softening point is attained, the enclosed propellant expands the individual filler particles to a hollow sphere by evaporation.

Because of the low weight of the hollow body fillers, the attempt was made to incorporate them in fiber composites for weight reduction by admixing them with the laminating resin. However, when using this method, the viscosity and, therefore, the laminating behavior of the soaking resin is adversely affected and one does not succeed in incorporating the relatively coarse grained hollow body fillers into the cavities of the reinforcing fibers, but they are retained at the surface. Another difficulty resides in that the susceptible hollow body fillers do not withstand any great mechanical load and they are thus partly destroyed already upon stirring into the laminating resin or during the actual laminating procedure and, therefore, can no longer contribute to the intended weight reduction.

A process is also known, whereby the unexpanded microspheres together with the latex of a curable binder are sprayed onto a web of textile staple fibres and the so-obtained web is heated to the softening point of the thermoplastic of the microspheres. In such a way a very voluminous, non-woven article with a high water absorbency is obtained, which can serve as dusters or wiping cloths as well as for surgical dressing (U.S. Pat. No. 3,676,288). Such bonded fibrous webs have also already been impregnated with a liquid resin-curing mixture and used in the manufacture of formed fiber-reinforced plastic articles. Here, however, they are only suitable as the basis material due to their low strength, whereas the reinforcement of the duroplastics of continous filaments with a higher modulus of elasticity than that of the cured duroplastic has to be achieved (DE-B No. 24 33 427).

The invention is based on the problem of creating a finished reinforcing material for the benefit of the processor which avoids all the above-described disadvantages of the incorporation of the hollow body fillers into the fiber composite and which allows a reduction of the specific weight of the fiber composites without loss of strength.

It has now surprisingly been found that it is possible also to permanently reduce the resin pick up and the specific weight of the usual reinforcing materials for duroplastics in the form of rovings, yarns or loosely spun double yarns or webs, knitted fabrics or stitch bonded products made thereof without impairing the strength properties of composites produced with such duroplastics, if the continous parallel elementary filaments in the roving, yarn or double yarn with a high modulus of elasticity are spread apart or separated using an aqueous binder-free suspension of unexpanded preform particles of the hollow plastic microspheres and the resulting interspaces are predominantly filled with the particles and the so obtained material is subjected for the required duration to a temperature necessary for the expanding process of the preform particles.

When speaking of continous filaments or fibers here, what is meant are not the textile fibres or staple fibres, which are only at most a few centimeters long, but those with very large lengths, in which the rovings, yarns or loosely spun double yarns normally used for reinforcement purposes come onto the market or also are still found in the webs, knitted fabrics or stitch bonded products made from them.

As a result of the manufacturing process the elementary filaments in filaments, parallel rovings, continuous yarns etc are usually provided with dressings which are more or less strongly adhesive. By treating the continous strands as according to the invention with an aqueous suspension of the unexpanded microspheres the water-soluble dressings or binding agent are dissolved in the water and consequently removed. Only in this way is it possible to separate the elementary filaments from each other and at least spread them apart, so that at the same time the particles of the unexpanded preform of the hollow microspheres can penetrate into the resulting interspaces and fill them to the greatest extent. Therefore it is preferable that the separation of the elementary filaments and the introduction of the unexpanded microspheres simultaneously take place with the treatment of the continuous strands with the aqueous suspension. It is also possible, however, to remove the dressings or binding agents which adhere to the rovings, the yarns or the double yarns in a separate process before the introduction of the hollow microspheres. And in case the dressing or adhesive is not sufficiently water-soluble, then one can also use a solvent for that purpose.

The separation of the elementary filaments and/or the introduction of the unexpanded hollow microspheres into the fiber strands can take place for example in such a way that the fiber strands are subjected in a bath comprising an aqueous binder-free bath to an intensive fulling process during which the parallel elementary filaments of the reinforcing fibers are spread apart thereby allowing an intimate penetration of the filler particles. The fiber strands can be subjected to jets of water with a high pressure of for example 2 to 10 bar or to the suspension in order to attain the desired movement of the elementary filaments towards each other and to embed the unexpanded microspheres inbetween. The same is applicable for the treatment of webs, knitted fabrics or stitch bonded products made of continous fibers. Following the introduction of the particles the fiber strands or webs are stripped with the suitable means, e.g. rubber lips or continous eyelets, so that no unexpanded hollow microspheres remain unattached on the surface. The fiber strands or webs treated in such a manner are then drawn through a drying tunnel and there dried using air and heat. The microspheres which are now enclosed between the fiber strands loose and dry cannot fall out of the rovings, the yarns or the loosely spun double yarns with the parallel continous elementary filaments despite the lack of any binding agent, because the strands are under pressure and the elementary filament squeeze in the microspheres which lie between them.

After drying the fiber strands or webs are drawn through an oven at a temperature of between 80° to 150° C., the amount of time they are exposed to the heat is between 15 seconds to around 15 minutes. Due to the exposure of heat the propellant expands the microspheres to a diameter of around 20 to 300 $\mu$m, and the expanding hollow microspheres press the elementary filaments of the fiber strand apart and fill up virtually the whole of the interspaces, whereby the diameter of the fiber strand or the thickness of the flat-shaped article which is produced from it can grow by 2- to 30-fold. The expansion process is conducted in such a way that the microspheres towards the end slightly sinter together and simultaneously acquire a certain connection to the elementary filaments.

By virtue of the method of the subject invention, a reinforcement suitable for duroplastics is obtained containing hollow body fillers having a particle size of from between 20 and 300 $\mu$m and can be directly put at the disposal of the moulder in this form. The resin pick up can be controlled continuously, depending on the added amount of the filler particles and intensity of the temperature treatment, up to a point wherein no further pick-up is possible.

For reasons of costs, predominantly glass fibers come into question as suitable fibrous material for the manufacture of the duroplastic reinforcing material of the subject invention, however, modifications of the reinforcing material are also possible by using other fibers with a high modulus of elasticity, such as carbonaceous and aramide fibers.

Reinforcing fibers in the form of webs or non-woven mats have proved to be particularly suitable for the accommodation with hollow body fillers.

The already abovementioned stitch bonded products are produced, for example, by cutting rovings, yarns or loosely spun double yarns from the continuous fibers into defined lengths, e.g. the production width of around 100 cm, with the help of special machines like the "Malimo" stitch bonding machine. These lengths are then connected like rungs of a rope ladder with knitting filaments to obtain a flat-shaped article. In this case the fiber strands run through the production process crosswise and not lengthwise. In accordance with the "Malimo" technique the crosswise fiber strands can additionally be connected with lengthwise running fiber strands, whereby the strands are sewn together at their crossing points.

Another possibility to connect continuous fiber strands to a flat-shaped article is interweaving. The structure of the web is decisive for the structure of the finished products. The fiber strands in which the microspheres are to be embedded in the desired manner according to the process described above are only allowed to be very loose in warp and/or weft. If finished flat-shaped articles are to be expanded, then characteristic structures result, since the balloon shaped expansion of the fiber strand essentially can only take place between the crossing points of warp and weft, while at the crossing points tie up occurs. The stitch bonding product or web hereby take on an appearance of chains of pearls connected to one another. The material possesses excellent properties for certain areas of application on account of this particular structure.

For example, when several layers of such flat-shaped articles are placed on top of each other the layers interlock, whereby a high interlaminary transverse strength comes about for layer material. Also the channels formed as a result of the tie ups have a desirable effect. By use of the material in a press process or for vacuum injection this allows for an excellent flow behaviour and an even distribution of the liquid resin within the mold.

Very tight webs, i.e. webs with high filament in warp and weft change their material thickness only minorily by the blowing process. If the duroplastic molder desires a laminate quality of maximum strength, in which the portion of reinforcing fibers in the overall volume of the laminate must be as high as possible while the portion of resin, for reasons of costs, as small as possible, this can be done by the selection of a web structure which is tight and strong to such an extent that an increase of the material thickness is hardly possible. A strong expansion of the web during the blowing process can also be prevented by effecting, for example, the blowing process between range spacers so that the spheres can merely fill the interspaces between the elementary filaments. Starting from a quality of the kind, for example, the overall structure of a laminate—to the manufacture of which the process of the subject invention is preferably used—can be prepared without additional use of sheathing layers.

In contrast, if the molder desires a very light and voluminous material, for example, for the processing in laminate cores, the original material thickness can be increased by 2- to 30-fold, in particular 5- to 10-fold, by the selection of loose and coarse textures, i.e. by embedding the hollow body fillers, the resin pick-up of the reinforcing fibers is simultaneously reduced and the thickness of the material increased relative to the starting material. The material obtained by high expansion which is extremely light and is manufactured to have a low resin pick-up is desirable, for example, for laminates having a high resistance to bending.

The described embodiments of the invention according to which yarns, double yarns and rovings are modified with unexpanded hollow body fillers to obtain preforms for the flat-shaped articles offer an access to finished products with completely different possible fields of application, depending on whether the web made therefrom has a loose or tight structure.

There are various ways to manufacture reinforcing materials with lower resin pick up and reduced specific weight in a flat shape: The obtained rovings, yarns or double yarns with the embedded hollow microspheres can be fabricated into a web, knitted fabrics or stitch bonded products in a familiar manner. One can undertake the separation of the continous elementary filaments and the introduction of the unexpanded preform of the hollow plastic microspheres, like already described above, with webs, knitted fabrics and stitch bonded products of continuous fibers and then expose these to the expanding process or one can produce webs, knitted fabrics or stitch bonded products from the rovings, yarns or double yarns with the enclosed particles of the not yet expanded hollow microspheres before the expansion process.

Furthermore, the object of the invention is a reinforcing material for duroplastics in the form of a roving, a yarn or a loosely spun double yarn of continuous elementary filaments free of any binding agent arranged parallel to each other with a high modulus of elasticity, a substantial part of the parallel elementary filaments being spread apart or separated, the cavities between the elementary filaments being predominantly filled by hollow plastic microspheres with a diameter of 20 to 300 $\mu$m and the resin pick up and specific weight being reduced.

Object of the invention is moreover a reinforcing material for duroplastics in the form of a roving, a yarn or a loosely spun double yarn of continuous elementary filaments free of any binding agent arranged parallel to each other with a high modulus of elasticity, a substantial part of the parallel elementary filaments being spread apart or separated, the cavities between the elementary filaments being predominantly filled by hollow plastic microspheres with a diameter of 20 to 300 $\mu$m and the resin pick up and specific weight being reduced.

Both in the strand-shaped as well as the flat-shaped reinforcing material of the invention the hollow microspheres are preferably embedded in such an amount that the thickness is the 2- to 30-fold, in particular the 5- to 10-fold of the thickness of the starting material.

The reinforcing materials of the invention are preferred for use in the manufacture of light laminates made of duroplastics. Therefore the object of the invention is also a duroplastic fiber composite with a low specific weight characterized by rovings, yarns or loosely spun double yarns of parallel arranged continous elementary filaments with a high modulus of elasticity, containing a reinforcing material, of which a substantial part is spread apart or moved apart and whose hollow cavities between the elementary filaments are predominantly filled with hollow plastic microspheres with a diameter of 20 to 300 $\mu$m.

Figure 2:
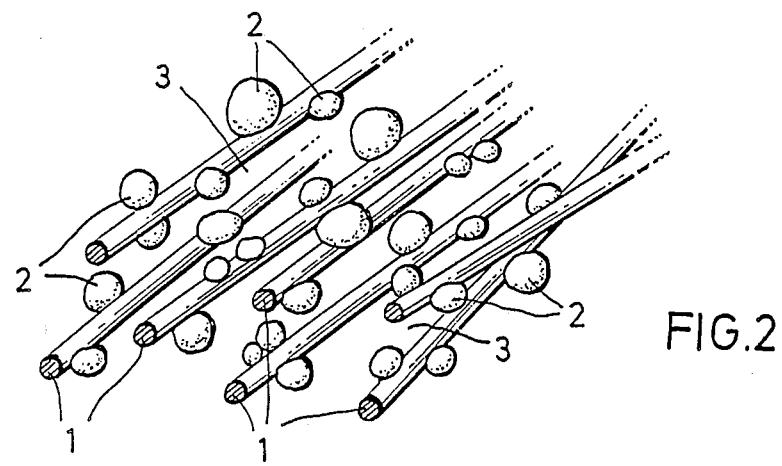

In the drawing, the reinforcing material for duroplastics of the subject invention is schematized according to electron micrographs in an enlargement in which 2.5 cm in FIGS. 1 and 2 correspond to about 100 $\mu$m. FIG. 1 shows the material in a top plan view; FIG. 1 in a perspective view.

One can clearly see the microspheres 2 of expanded thermoplastic material (thermoplastic microspheres) embedded between the individual glass fibers 1, said microspheres being prepared from the unexpanded particles of a vinylidene chloride-acrylonitrile copolymer (unexpanded Expancel ®) by heating for a short period of time. The cavity which remains for filling with the soaking resin is designated by 3.

EXAMPLE 1

A parallel roving with 12240 continous elementary fibers of glass is unwound from a 10000 m supply coil at a speed of 2 m per minute and drawn through a bath comprising an aqueous suspension, which contains 10% weight of unexpanded Expancel. In the bath the strand is subjected to ultrasonic vibrations from a normal commercial generator. The outer-lying adherent particles and excess water are stripped away as the strand runs through an eyelet accordingly dimensioned for that purpose. The parallel roving treated in such a way has taken up 8% by weight of the particles and is drawn through a drying tunnel into which hot air at a temperature of 80° C. is introduced. Afterward the fiber strand is drawn through an oven heated by infrared radiation, which it leaves with 150° C. The time it stays in the oven is around 3 minutes. The hollow micropheres have taken on an average diameter of 60 μm and the fiber strand has grown ten-fold in diameter.

EXAMPLE 2

A glass fiber web in linen weave with a warp material of 68 tex and 15 fibers/cm and a weft material of 136 tex and 3 fibers/cm was drawn through a bath in accordance with Example 1 and thereby fulled with rubber coated rolls. Excess water and unexpanded microsphere adhering to the surface were stripped off as the material passed through rubber lips. The material took up 25 g per m$^2$ of the unexpanded filler. It is then dried in a hot-air oven and heated in a hot oven with infrared radiation in 3 minutes to a final temperature of 150° C. The thickness of the web was increased by ten times due to the expansion of the hollow microspheres and the average size of the hollow microspheres is 60 μm. Several layers of this web were alternately placed into a mold with an ordinary commercial unsaturated polyester resin. The application of resin was effected with a spray gun and the evening out with deaerating rollers. The specific density of the light fiber composite was 0.7 g/cm$^3$. The resin pick-up was about 35% by volume.

I claim:

1. A reinforcing material for duroplastics in the form of a roving, a yarn or a loosely spun double yarn of continuous elementary filaments arranged parallel with a high modulus of elasticity, characterized by a substantial part of the parallel elementary filaments free of any binding agent being spread apart or separated, by the cavities between the elementary filaments being predominantly filled by hollow plastic microspheres with a diameter of 20 to 300 μm and the resin pick up and specific weight being reduced.

2. A reinforcing material according to claim 1 characterized by the hollow microspheres being embedded in such an amount, that the thickness of the unbonded roving, yarn or loosely spun double yarn produced is in particular the 5- to 10-fold of 2- to 30-fold, in particular the 5- to 10-fold of the thickness of the starting material.

3. A reinforcing material for duroplastics in the form of a web, knitted fabric or stitch bonded product of yarn, roving or loosely spun double yarn with continuous parallel arranged elementary filaments with a high modulus of elasticity characterized by a substantial part of the parallel elementary filaments free of any binding agent being spread apart or separated, by these cavities between the elementary filaments being predominantly filled by hollow plastic microspheres with a diameter of 20 to 300 μm and the resin pick up and specific weight being reduced.

4. A reinforcing material according to claim 3 whereby the hollow microspheres are embedded in such an amount that the thickness of the unbonded web, knitted fabric or stitch bonded product produced is 2- to 30-fold, the thickness of the starting material.

5. A reinforcing material according to claim 1, wherein the fibers with high modulus of elasticity consist of glass, carbonaceous or aramide fibers.

6. A reinforcing material according to claim 1, the true density of the hollow body filler being 0.02–0.2 kg/dm$^3$.

7. A reinforcing material according to claim 1, characterized by the absorptive power for liquid curable resins, being adjusted to the desired value by the amount of the embedded hollow body filler.

8. A reinforcing material according to claim 1, wherein the hollow microspheres consist of a thermoplastic.

9. A duroplastic fiber composite with a low specific weight characterized by rovings, yarns or loosely spun double yarns of parallel arranged continous elementary filaments with a high modulus of elasticity, containing a reinforcing material, of which a substantial part is spread apart or moved apart and whose hollow cavities between the elementary filaments are predominantly filled with hollow plastic microspheres with a diameter of 20 to 300 μm.

10. A composite according to claim 9, wherein the filaments comprise glass, the hollow plastic microspheres comprising a vinylidene chloride-acrylonitrile copolymer, the duroplastic comprising an unsaturated polyester resin.

* * * * *

UNITED STATES PATENT AND TRADEMARK OFFICE
CERTIFICATE OF CORRECTION

PATENT NO. : 4,820,575

DATED : April 11, 1989

INVENTOR(S) : Kolzer

It is certified that error appears in the above-identified patent and that said Letters Patent is hereby corrected as shown below:

Col. 8, lines 6-7,    Delete "in particular the 5- to 10-fold of"

Col. 8, lines 7-8,    Delete ", in particular the 5- to 10- fold of"

Signed and Sealed this

Tenth Day of July, 1990

Attest:

HARRY F. MANBECK, JR.

*Attesting Officer*            *Commissioner of Patents and Trademarks*